United States Patent
Custon et al.

(10) Patent No.: US 9,252,605 B1
(45) Date of Patent: Feb. 2, 2016

(54) APPARATUS FOR CHARGING MULTIPLE MOBILE DEVICES

(71) Applicant: Fonefill, Inc., San Diego, CA (US)

(72) Inventors: Charles Custon, San Diego, CA (US); Clayton R. Karmel, San Diego, CA (US); John Hubble, San Diego, CA (US)

(73) Assignee: Fonefil, Inc., San Diego, CA (US)

( * ) Notice: Subject to any disclaimer, the term of this patent is extended or adjusted under 35 U.S.C. 154(b) by 204 days.

(21) Appl. No.: 14/147,518

(22) Filed: Jan. 4, 2014

Related U.S. Application Data (60) Provisional application No. 61/749,282, filed on Jan. 5, 2013.

(51) Int. Cl.
    *H02J 7/00* (2006.01)
(52) U.S. Cl.
    CPC .................................... *H02J 7/0027* (2013.01)
(58) Field of Classification Search
    USPC ........................................................ 320/107
    See application file for complete search history.

(56) References Cited

U.S. PATENT DOCUMENTS

| | | | |
|---|---|---|---|
| D300,678 S | 4/1989 | Barrault | |
| 5,195,183 A * | 3/1993 | Miller et al. | 709/231 |
| D475,417 S | 6/2003 | Wintersteiger | |
| D476,376 S | 6/2003 | Wintersteiger | |
| D508,458 S | 8/2005 | Solland et al. | |
| D537,409 S | 2/2007 | Suzuki | |
| D548,688 S | 8/2007 | Fee et al. | |
| D585,898 S | 2/2009 | Skurdal | |
| D594,404 S | 6/2009 | Kuo et al. | |
| D627,718 S | 11/2010 | Houghton | |
| 8,030,900 B2 * | 10/2011 | Hussain et al. | 320/135 |
| D654,431 S | 2/2012 | Stephanchick et al. | |
| 2006/0261778 A1 | 11/2006 | Elizalde Rodarte et al. | |
| 2007/0205744 A1 | 9/2007 | Corbins | |
| 2007/0247111 A1 * | 10/2007 | Kaji et al. | 320/107 |
| 2010/0259213 A1 * | 10/2010 | Maharaj | 320/107 |
| 2011/0181235 A1 * | 7/2011 | Walley et al. | 320/103 |
| 2012/0119693 A1 | 5/2012 | Purdy et al. | |
| 2013/0165096 A1 * | 6/2013 | You | 455/417 |

* cited by examiner

*Primary Examiner* — Samuel Berhanu
(74) *Attorney, Agent, or Firm* — Clause Eight IPS; Michael Catania (57) ABSTRACT

A stackable, durable, portable apparatus for simultaneously charging multiple mobile electronic devices (including phones, tablets, game consoles, music players, flashlights, BLUETOOTH headsets and cameras) is disclosed herein. The apparatus is suitable for use in public social settings, easily removed or replaced for restoring the internal charge without requiring cable attachment, expertise or training.

18 Claims, 10 Drawing Sheets

APPARATUS FOR CHARGING MULTIPLE MOBILE DEVICES

CROSS REFERENCE TO RELATED APPLICATION

The present application claims priority to U.S. Provisional Patent Application No. 61/749,282, filed on Jan. 5, 2013, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to an apparatus and method for charging multiple mobile devices. The present invention specifically relates to an apparatus and method for charging multiple mobile devices in a public restaurant or bar.

2. Description of the Related Art

Mobile electrical devices, such as mobile phones, have become a necessary component of most people's life. Most people constantly carry have a mobile electrical device. However, these devices require charging. In public venues, such as restaurants and bars, charging a mobile electrical device is difficult. Unless the patron is carrying a mobile charger for the mobile electrical device, and the patron is seated near a power outlet, charging a mobile electrical device is impossible. Further, leaving a mobile electrical device on a table of a restaurant or bar opens the possibility of water damage to the device due to the presence of food and drink. Thus, restaurants and bars are hazardous environments for mobile electrical devices.

The prior art discusses various methods for charging mobile communication devices such as mobile phones and tablet computers.

Corbins, U.S. Patent Publication Number 20070205744 for a Portable Mobile Phone Charger, discloses a mobile phone charger that includes a housing with a receptacle mounted therein for receiving a power cord adapter, and a power source housed therein and electrically connected to the receptacle for electrically charging a mobile phone.

Rodarte et al., U.S. Patent Publication Number 20060261778, for a Method And Apparatus For Charging A Portable Electrical Device, discloses a charger-to-device interface that self aligns the portable electrical device in the charger for charging.

Purdy et al., U.S. Patent Publication Number 20120119693, for a Battery Charger For Portable Devices And Related Methods, discloses a battery charger that may be used with numerous types of portable devices and associated batteries, and yet which may account for differences between the charging parameters thereof.

The prior art fails to disclose a portable device charger that can charge multiple mobile devices in a hazardous environment such as a restaurant or bar.

BRIEF SUMMARY OF THE INVENTION

One aspect of present invention is a stackable, durable, portable system for charging of 1 to 3 (or more) mobile electronic devices, including phones, tablets, game consoles, music players, flashlights, BLUETOOTH headsets and cameras. The invention is suitable for use in public social settings, easily removed or replaced for restoring the internal charge without requiring cable attachment, expertise or training.

The apparatus for charging multiple mobile devices is preferably capable of charging PDs at differing rates based on PO demand, the number of PDs attached, and the internal charge state of the device.

The apparatus for charging multiple mobile devices is preferably capable of supporting one or multiple PDs in a convenient and usable position during charging, enabling the use of PDs for social interaction while charging.

The apparatus for charging multiple mobile devices is preferably is capable of controlling its own re-charging rate while 'stacked' based on available power to the stack and each device in the stack, the internal charge of the device's own battery, and the position of the device in a stack of recharging devices.

The apparatus for charging multiple mobile devices is preferably capable of supporting a wide array of PDs in a lightly monitored environment (no easily damaged or removable parts—simple replacement of consumable elements of the device.

The apparatus for charging multiple mobile devices is preferably capable of being secured by a cable-lock to prevent theft of the device.

The apparatus for charging multiple mobile devices preferably has an innovative three pin stacking communication which safely allows exposure of the charging pins to end users while facilitating stacking and rapid programming, as well as variable charging rates based on position within the stack, own charge status and available power.

The apparatus for charging multiple mobile devices alternatively includes both NFC (Near Field Communications), Bluetooth and BlueTooth Smart personal area network (PAN) devices allowing communication with modern Smart Phones for the purposes of: determining/enablingphysical proximity for social grouping for Smartphone applications such as Truth or Dare or for exchange of information, photos, videos or other media. (The short range of the NFC and Bluetooth Smart PANs establishes presence and proximity to a highly personal level.); determining/enabling physical proximity for reviews, coupons or discounts. For example, reviews of a restaurant which are written while the user is at the restaurant may entitle the user to a discount on this or the next visit, or a discount for a nearby alternative entertainment (movies after dinner, for example); determining/enabling physical proximity for menus, specials of the day, waitress alerts, food status or seating status. (The ubiquitous stackable pagers may ironically be replaced by a single device placed near the check-in for a restaurant, enabling the user's SmartPhone to be the notification element. The PAN communication from the device to the phone can establish the identification and queue position so that a broadband message (SMS or data in an application) can notify the user that seating is available.

One aspect of the present invention is apparatus that is capable of charging more than one mobile device in environments that can cause damage to mobile devices. The apparatus includes a housing, a support mechanism, slots wherein to place the devices, a processor, and connectors that correspond to a device slot. The apparatus is set up to provide power to more than one mobile device, placed in the slots.

Another aspect of the present invention is a stable, durable, and portable system that is capable of charging more than one portable electronic device. The system includes an apparatus that has a housing, slots wherein to place the devices, a battery, a processor, and connectors with which to attach a portable device.

Yet another aspect of the present invention is an apparatus that is capable of charging more than one mobile device in environments that can cause damage to mobile devices. The apparatus comprises a housing, which includes an area to hold a changeable label for the purpose of advertising, a support mechanism, slots wherein to place the devices, a processor, and connectors that correspond to a device slot. The apparatus is set up to provide power to more than one mobile device, placed in the slots.

Yet another aspect of the present invention is an apparatus that is capable of charging more than one mobile device in environments that can cause damage to mobile devices. The apparatus comprises a housing, a support mechanism, slots wherein to place the devices, a processor, connectors that correspond to a device slot, and a video display that displays advertisements while a mobile device is being charged. The apparatus is set up to provide power to more than one mobile device, placed in the slots.

Yet another aspect of the present invention is a method for charging more than one mobile device in environments that can cause damage to mobile devices. The method includes charging a battery of an apparatus that is capable of charging more than one mobile device, placing one or more mobile devices in a slot of the apparatus housing, which is elevated above a surface of a venue, attaching to a mobile device a connector unit, which is connected to a cable that is connected to the apparatus, and charging the mobile device with power from the apparatus' battery.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

As shown in FIGS. 1-7, an apparatus for charging multiple mobile devices is generally designated 20. The apparatus 20 preferably comprises a housing 22 having a top section 24, a bottom section 26 and a side section 28. The housing 22 also preferably has multiple slots 30a and 30b for placement of a mobile device therein for charging and prevention of damage to the mobile device if the charging occurs in a hazardous (for mobile devices) environment such as a restaurant, bar or similar venue. The housing 22 interior is shown in FIGS. 10-16.

Figure 1:
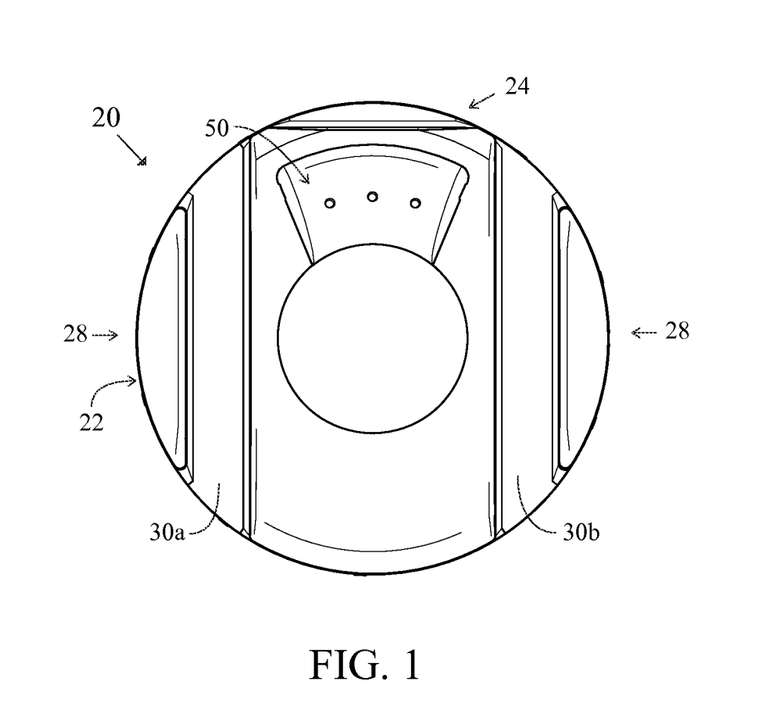
FIG. 1 is a top plan view of an apparatus for charging multiple mobile devices.

Cables 32 extend from the apparatus 20, each cable having a connection assembly 34 for connecting to a mobile device for charging thereof.

Figure 2:
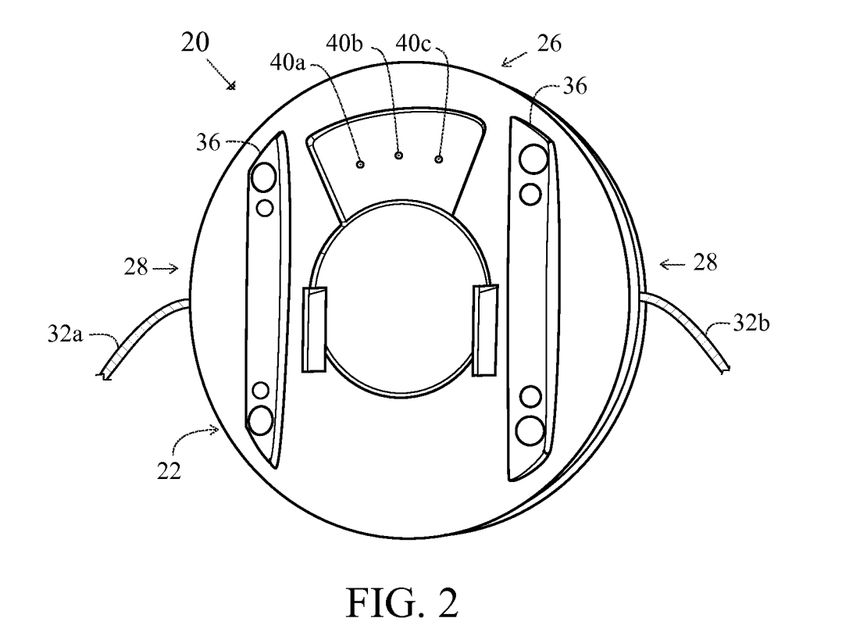
FIG. 2 is a bottom plan view of the apparatus for charging multiple mobile devices of FIG. 1.
Figure 3:
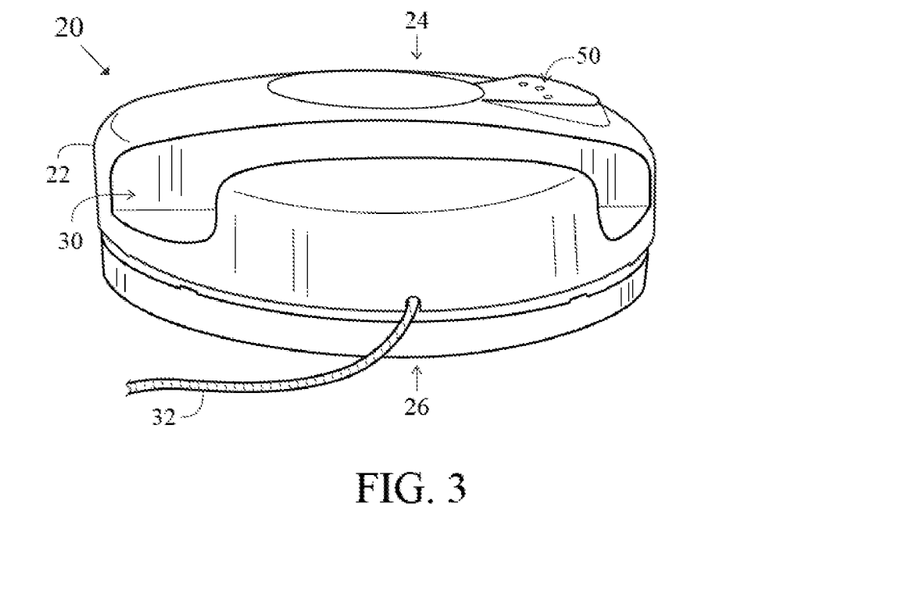
FIG. 3 is a side elevational view of the apparatus for charging multiple mobile devices of FIG. 1.
Figure 4:
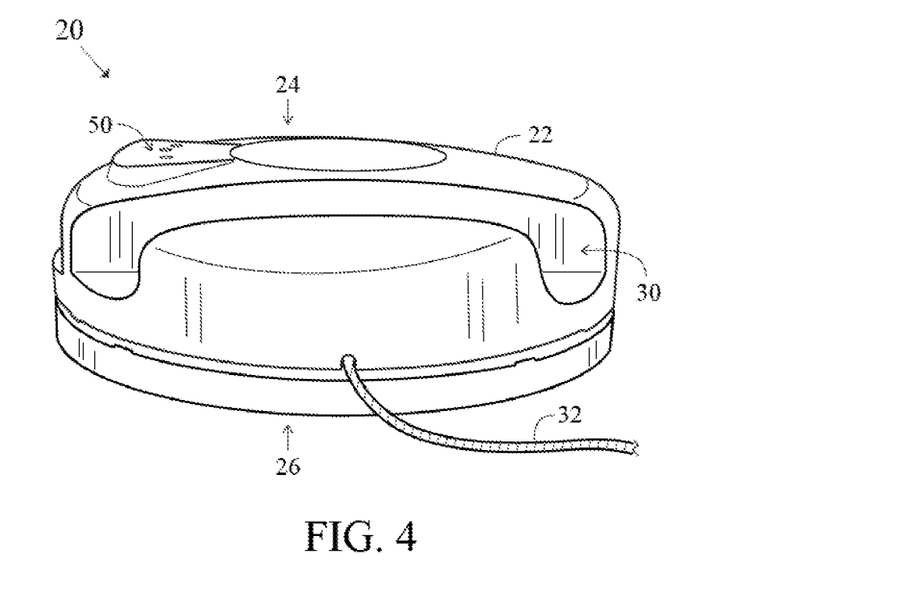
FIG. 4 is an opposing side elevational view of the apparatus for charging multiple mobile devices of FIG. 1.

The apparatus 20 also preferably has bottom rails 36 for maintaining the housing 22 above a surface of a venue, as shown in FIG. 2.

The apparatus also has a power cord 38 for connection to an outlet to charge a battery 42 of the apparatus 20.

Figure 5:
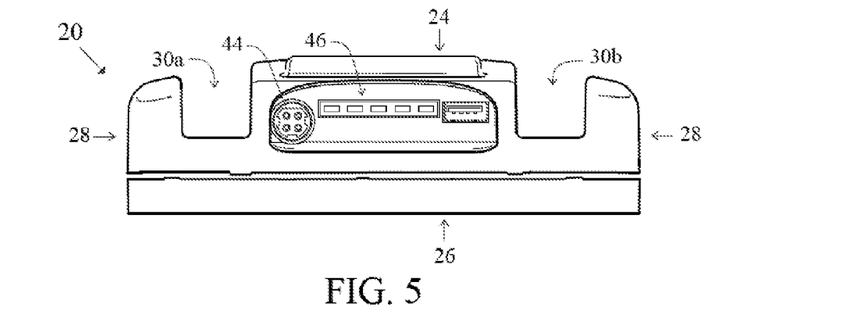
FIG. 5 is a front elevational view of the apparatus for charging multiple mobile devices of FIG. 1.
Figure 6:
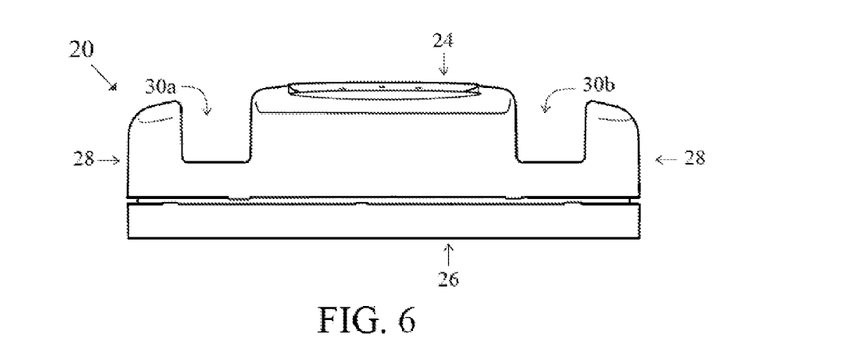
FIG. 6 is a back elevational view of the apparatus for charging multiple mobile devices of FIG. 1.
Figure 7:
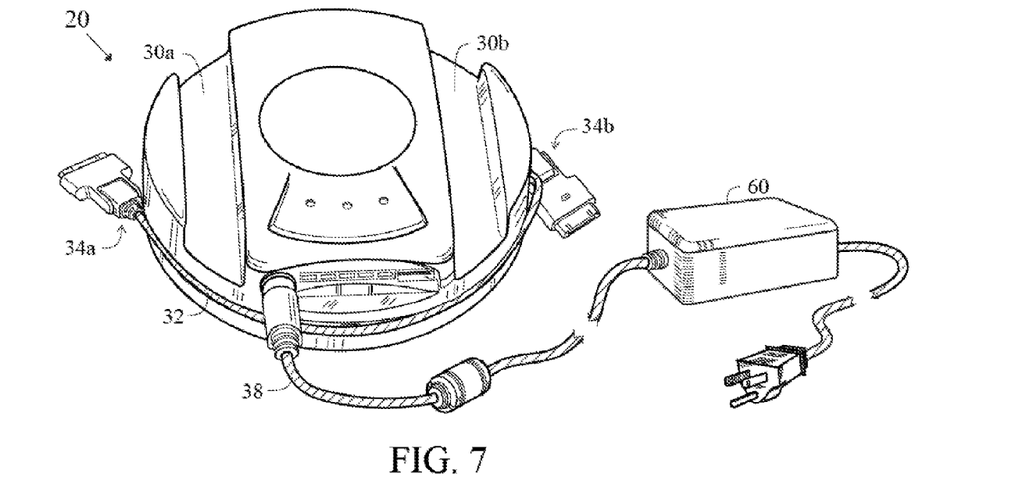
FIG. 7 is top perspective view of the apparatus for charging multiple mobile devices of FIG. 1 with a power cord.
Figure 9:
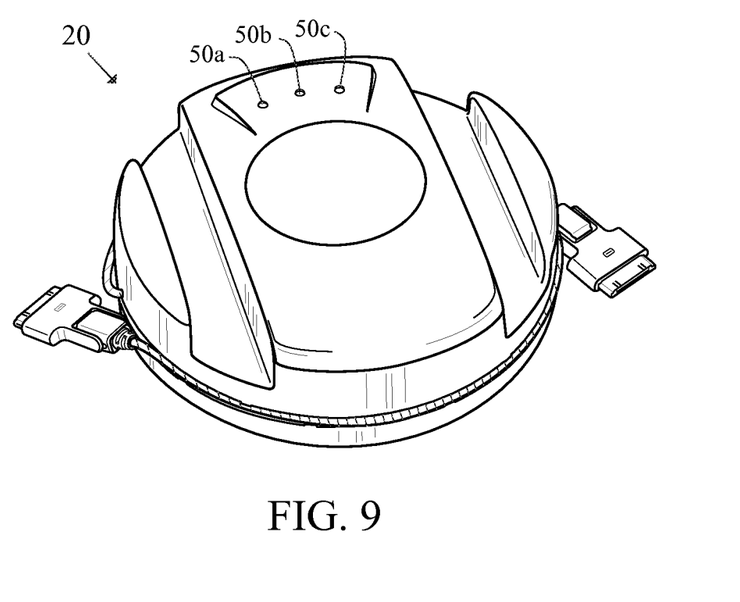
FIG. 9 is a top perspective view of the apparatus for charging multiple mobile devices.
Figure 10:
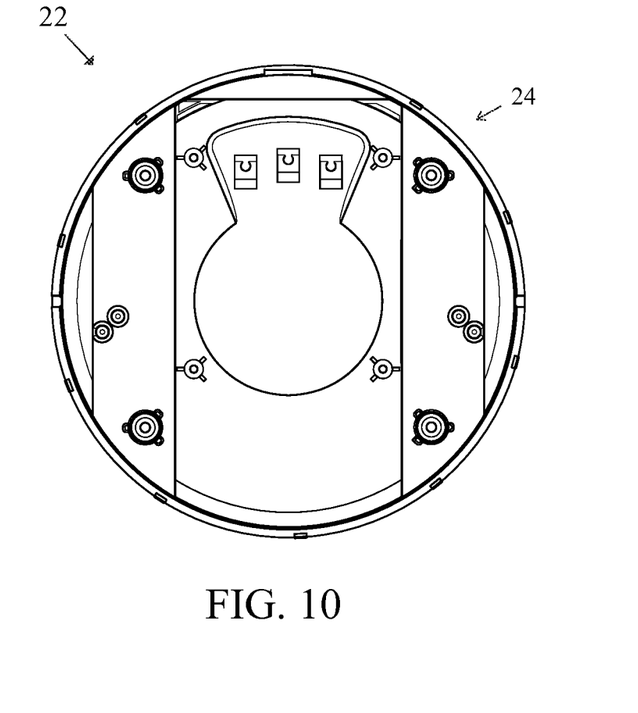
FIG. 10 is an interior view of a top section of the apparatus for charging multiple mobile devices.
Figure 11:
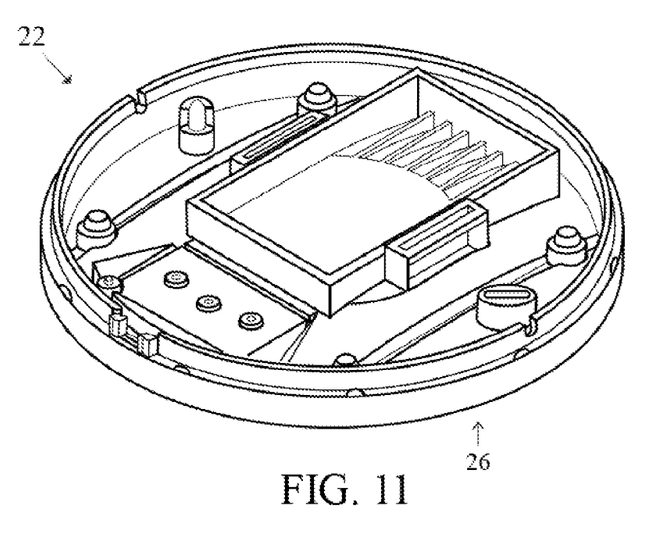
FIG. 11 is a top perspective view of an interior of a bottom section of the apparatus for charging multiple mobile devices.
Figure 12:
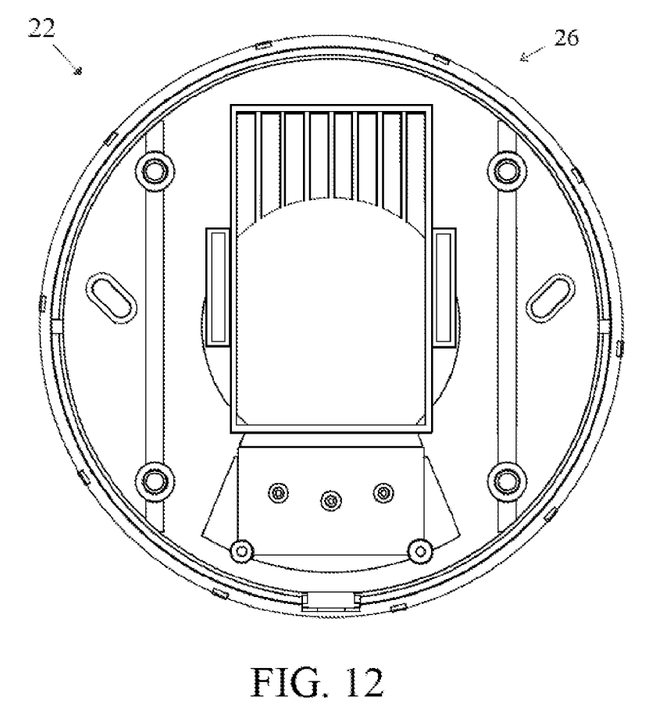
FIG. 12 is a top plan view of an interior of a bottom section of the apparatus for charging multiple mobile devices.
Figure 13:
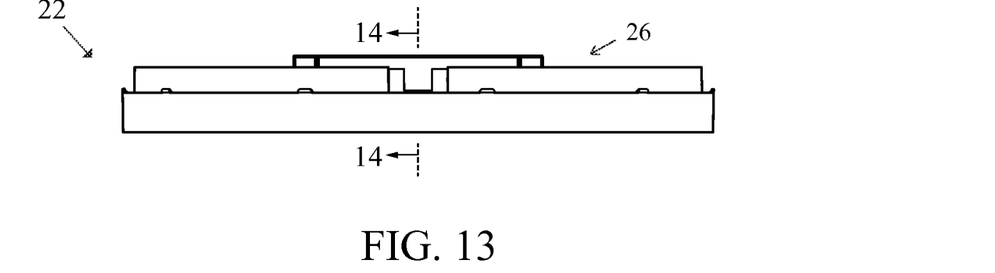
FIG. 13 is a side view of an interior of a bottom section of the apparatus for charging multiple mobile devices.
Figure 14:
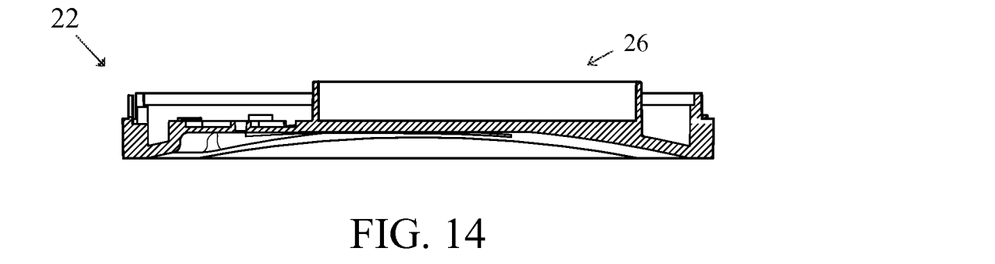
FIG. 14 is a cross-sectional view along line 14-14 of FIG. 13.
Figure 15:
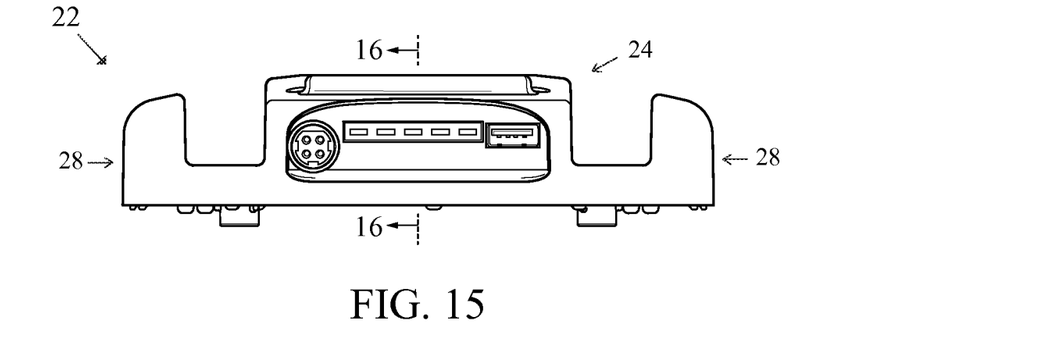
FIG. 15 is a front view of an interior of a top section of the apparatus for charging multiple mobile devices.
Figure 16:
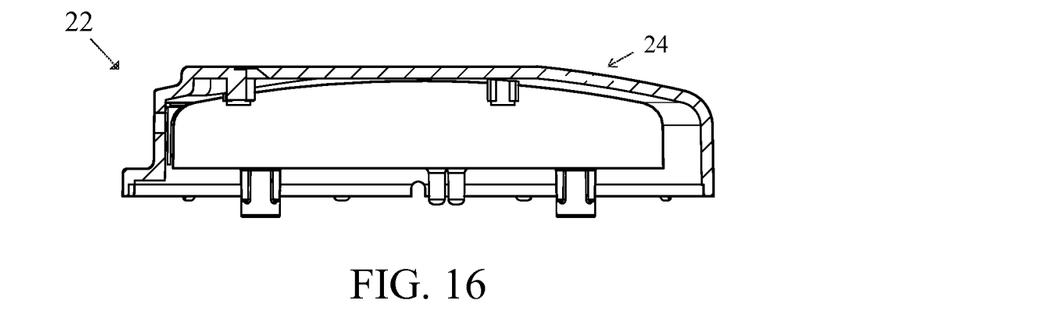
FIG. 16 is a cross-sectional view along line 16-16 of FIG. 15.

Electrical attributes of the apparatus 20 include pogo pins 40 (power 40a, ground 40b, digital control signal 40c) on the bottom section 26 for receiving 15 volts direct current ("DC") up to 10 amps, as shown in FIG. 2. A DC jack 44 for receiving 15 VDC up to 9 amps, as shown in FIG. 5. Pads 50 on the top section 24 (power 50a, ground 50b, digital control signal 50c) for delivering 15 VDC up to 9 A, as shown in FIG. 9. Multiple USB cables 32 for delivering 5V power up to 2.5 A per output. In a preferred embodiment, there are no alternating current ("AC") voltage connections. A preferred DC power source is a UL and CE approved AC/DC power adapter 60, as shown in FIG. 7.

The apparatus 20 preferably has three modes: standalone charging; stacked charging and dissipation.

During the standalone charging mode, the apparatus 20 receives DC power from the DC jack 44. This power is delivered across a resettable fuse to a battery charging integrated circuit (IC) 62 for charging of the internal lithium ion battery. The battery charges according to the battery-manufacturer recommended currents as set by resistors connected to the battery charging IC 62.

The LEDs 46 display a pattern that indicates usage information, followed by a repeating pattern unique to stacked charging for indication of the current mode of operation.

Figure 17:
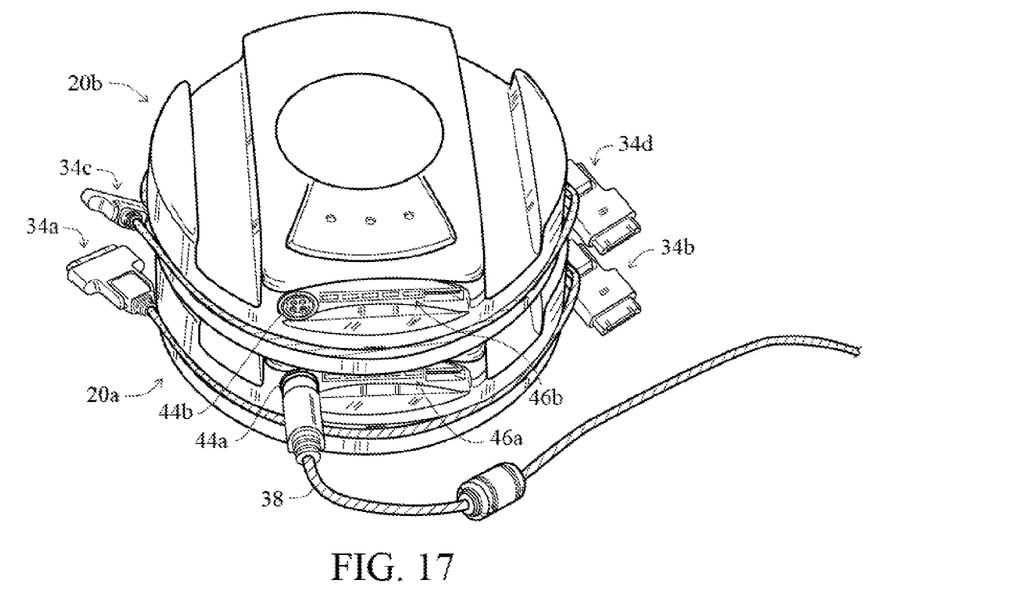
FIG. 17 is a top perspective front view of two apparatuses for charging multiple mobile devices stacked for charging.
Figure 18:
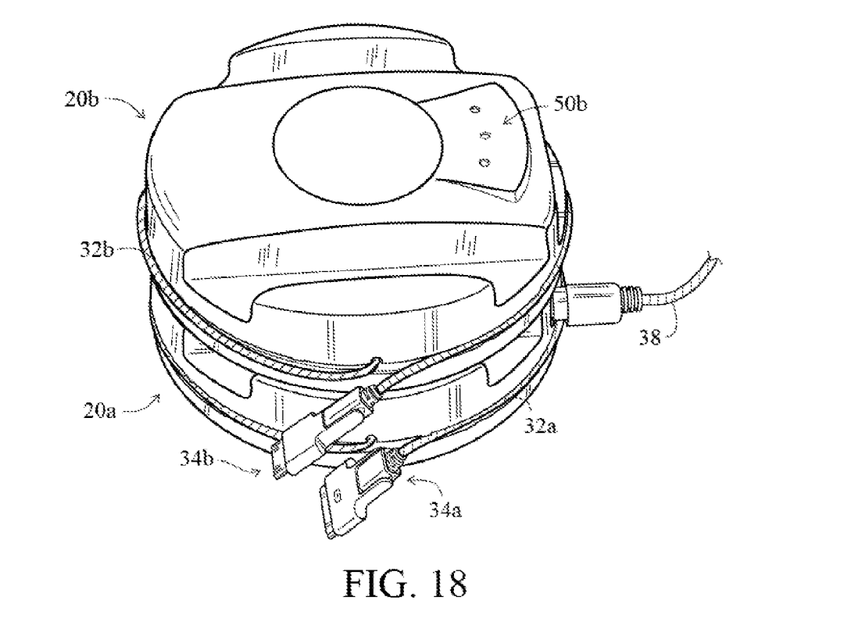
FIG. 18 is a top perspective side view of two apparatuses for charging multiple mobile devices stacked for charging.

During stacked charging, one apparatus 20b is placed on top of another apparatus 20a as shown in FIGS. 17-18. The apparatus 20 is designed such that the pads 50 on top of the apparatus 20a can connect to the pogo pins 40 on the bottom of a "stacked" apparatus 20b. If multiple apparatuses 20 are stacked together, the multiple apparatuses 20 will simultaneously charge their respective Li-ion batteries 42.

Each apparatus 20 has an always-on path from the bottom pogo pins 40 to the top pads 50 through a resistor that limits the current in addition to a normally-off FET. This minimal current is received by an apparatus 20 stacked above to provide just enough power to initiate an authentication sequence. If the above apparatus 20 is authenticated, the FET is enabled and the above apparatus 20 is allowed to charge its battery 42.

The LEDs 46 display a pattern that indicates usage information, followed by a repeating pattern unique to stacked charging for indication of the current mode of operation and battery level.

When disconnected from an external DC source, without a mobile device connected, the apparatus 20 is in an idle mode. The buck regulator 64 is disabled. Each of the USB charger circuits is in a low-power state. The apparatus 20 periodically wakes up to indicate the current battery level on the LEDs 46.

Figure 19:
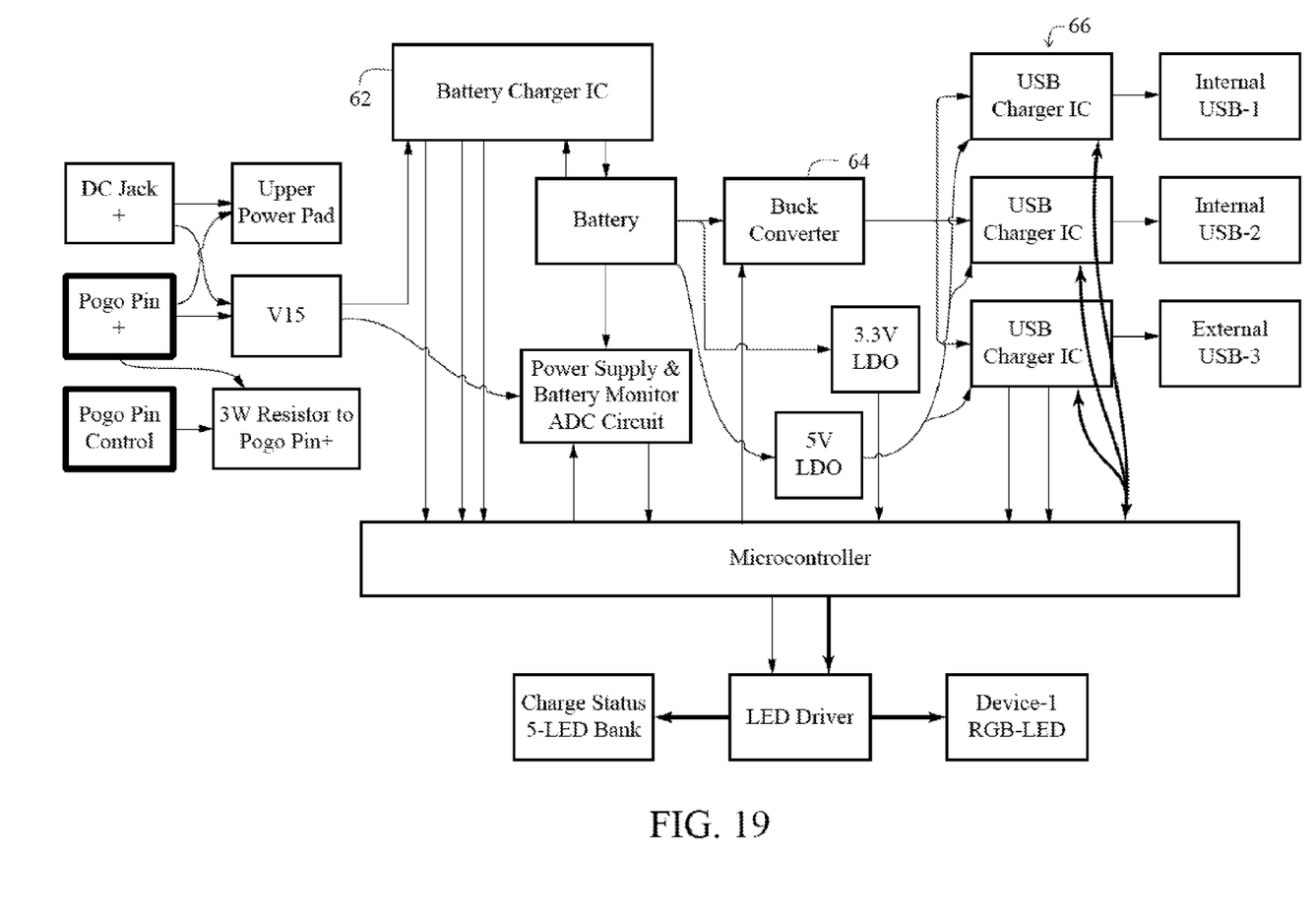
FIG. 19 is a block diagram of components for of the apparatus for charging multiple mobile devices.
Figure 19A:
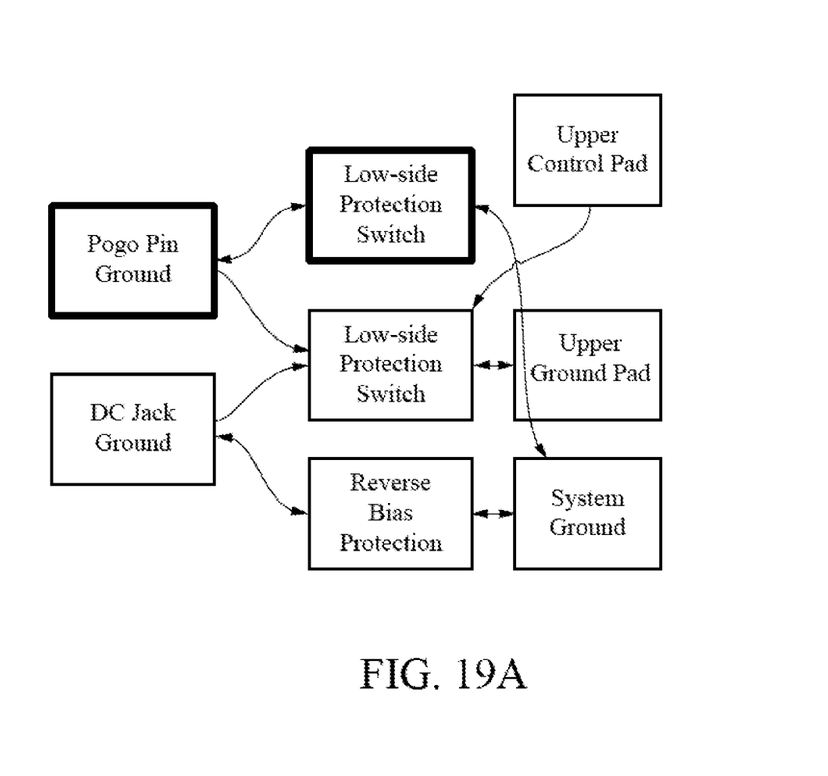
FIG. 19A is a block diagram of components for of the apparatus for charging multiple mobile devices.
Figure 19B:
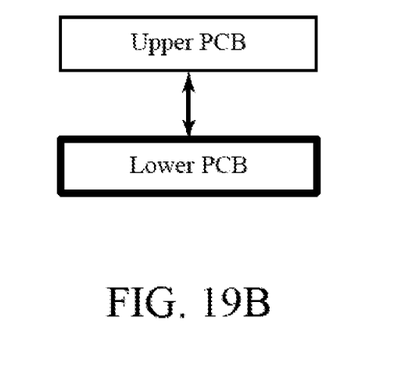
FIG. 19B is a block diagram of components for of the apparatus for charging multiple mobile devices.

During the dissipation mode, the apparatus 20 is disconnected from an external DC source and a mobile device 100 is connected to the apparatus 20 through a connection assembly 34. The apparatus 20 delivers power from its internal battery 42 through a buck (step-down) regulator 64 to multiple USB charger IC circuits 66. FIGS. 19, 19A and 19B illustrate the various circuitry and components of the apparatus 20. Each USB charger circuit 66 drives a USB output for connection to mobile devices 100. The signal levels on the USB data pins are optimized to the device type and manufacturer (APPLE/ANDROID/WINDOWS/SAMSUNG) to ensure charging beyond the USB 500 mA standard up to 2.5 A per mobile device 100. The USB outputs are current limited and short circuit protected. Power to each USB output may be current limited to restricted battery current to rated limits. Power to each USB output may also be limited to prioritize power delivery to the first USB device connected. The LEDs 46 display a repeating pattern unique to dissipation for indication of the current mode of operation and battery level.

Figure 8:
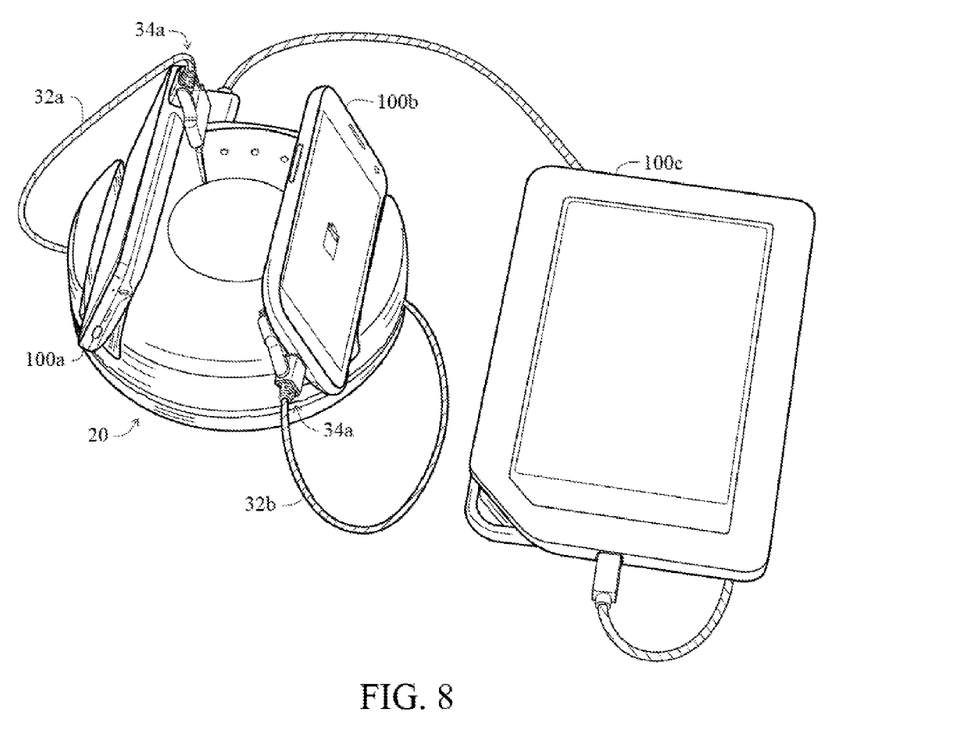
FIG. 8 is a top perspective view of the apparatus for charging multiple mobile devices of FIG. 1 with connection cables and multiple mobile devices positioned within the apparatus.

As shown in FIG. 8, multiple mobile devices 100 are simultaneously charged by the apparatus 20. Specifically, two mobile phones 100a and 100b and a table computer 100c are charged by the apparatus 20. The connection assembly 34 has multiple connectors for connecting to different devices such as iPHONE mobile phones or DROID mobile phones.

One aspect of the present invention is apparatus 20 that is capable of charging more than one mobile device in environments that can cause damage to mobile devices. The apparatus 20 includes a housing 22, a support mechanism, slots 30 wherein to place the devices 100, a processor, and connectors that correspond to a device slot 30. The apparatus 20 is set up to provide power to more than one mobile device 100, placed in the slots 30.

The mobile devices 100 are preferably selected from a mobile phone, a tablet computer, a MP3 player, a camera, a flashlight, a game console, and a BLUETOOTH headset. The apparatus 20 is preferably configured to charge mobile devices 100 at differing rates based on power output demand, the number of mobile devices 100 attached to the apparatus 20, and the internal charge state of the apparatus 20. The apparatus 20 is preferably configured to have three modes, the three modes comprising a standalone charging mode, a stacked charging mode and a dissipation mode. The apparatus 20 is preferably configured for stacking with a second apparatus 20b. Each of the plurality of device placement slots 30 is preferably an opening in a top section 24 of the housing 22 having a width ranging from 1 cm to 4 cm. The housing 22 preferably has a diameter ranging from 10 cm to 25 cm. The housing 22 preferably has a height ranging from 1 cm 7 cm. The apparatus 20 preferably further comprises a LED display 46 on the housing 22. The apparatus 20 preferably further comprises a buck regulator for delivering power to a plurality of USB IC charger circuits for delivering power to an attached mobile device 100. The apparatus 20 preferably further comprises a plurality of pogo pins 40 on a bottom section 26 of the housing 22 and a plurality of pads 50 on a top section 24 of the housing 22, the plurality of pogo pins 40 and the plurality of pads 50 for stacking multiple apparatuses 20. The apparatus 20 preferably further comprises a lithium-ion battery. The plurality of pads 50 preferably comprises a power pad 50a, a ground pad 50b and a digital signal control pad 50c. The plurality of pogo pins 40 preferably comprises a power pin 40a, a ground pin 40b and a digital signal control pin 40c. The apparatus 20 preferably further comprises at least one secondary connection not associated with a placement slot 30. The housing 22 is preferably composed of a durable plastic material. The apparatus 20 preferably allows for a mobile device 100 to charge above a wet surface. The apparatus 20 preferably further comprising a power cord 38 for connection to a power source for powering the apparatus 20. The plurality of device placement slots 30 preferably comprises two device placement slots 30 substantially parallel to each other.

Another aspect of the present invention is a stable, durable, and portable system that is capable of charging more than one portable electronic device 100. The system includes an apparatus 20 that has a housing 22, slots 30 wherein to place the devices 100, a battery, a processor, and connectors with which to attach a portable device 100.

The portable devices 100 of the system are preferably selected from the group including phones, tablets, game consoles, music players, flashlights, BLUETOOTH headsets and cameras. The system is preferably suitable for use in public social settings, easily removed or replaced for restoring the internal charge without requiring cable attachment, expertise or training. The system is preferably capable of charging portable devices 100 at differing rates based on a power output demand, the number of portable devices attached, and the internal charge state of the system. The system is preferably capable of supporting one or multiple portable devices 100 in a convenient and usable position during charging, enabling the use of portable devices for social interaction while charging. The system is preferably capable of controlling its own re-charging rate while 'stacked' based on available power to the stack and each apparatus in the stack, the internal charge of the battery, and the position of the apparatus in a stack of recharging apparatuses 20. The system is preferably capable of supporting a wide array of portable devices 100 in a lightly monitored environment. The system is preferably capable of being secured by a cable-lock to prevent theft of the apparatus. The system preferably has an innovative 3 pin stacking communication which safely allows exposure of the charging pins to end users while facilitating stacking and rapid programming, as well as variable charging rates based on position within the stack, own charge status and available power. The system preferably includes both NFC (Near Field Communications), BLUETOOTH and BLUETOOTH Smart personal area network (PAN) devices. The NFC (Near Field Communications), BLUETOOTH and BLUETOOTH Smart personal area network (PAN) devices allows communication with modern Smart Phones for the purposes of determining/enabling physical proximity for social grouping for Smartphone applications such as Truth or Dare or for exchange of information, photos, videos or other media. The NFC (Near Field Communications), BLUETOOTH and BLUETOOTH Smart personal area network (PAN) devices allows communication with modern Smart Phones for the purposes of determining/enabling physical proximity for reviews, coupons or discounts. The NFC (Near Field Communications), BLUETOOTH and BLUETOOTH Smart personal area network (PAN) devices allows communication with modern Smart Phones for the purposes of determining/enabling physical proximity for menus, specials of the day, waitress alerts, food status or seating status. The PAN communication from the apparatus 20 to the phone 100 can establish the identification and queue position so that a broadband message (SMS or data in an application) can notify the user that seating is available.

Yet another aspect of the present invention is an apparatus 20 that is capable of charging more than one mobile device in environments that can cause damage to mobile devices 100. The apparatus 20 comprises a housing 22, which includes an area to hold a changeable label for the purpose of advertising, a support mechanism, slots 30 wherein to place the devices 100, a processor, and connectors that correspond to a device slot 30. The apparatus 20 is set up to provide power to more than one mobile device 100, placed in the slots 30.

Yet another aspect of the present invention is an apparatus 20 that is capable of charging more than one mobile device 100 in environments that can cause damage to mobile devices 100. The apparatus 20 comprises a housing 22, a support mechanism, slots 30 wherein to place the devices 100, a processor, connectors that correspond to a device slot 30, and a video display that displays advertisements while a mobile device 100 is being charged. The apparatus 20 is set up to provide power to more than one mobile device 100 placed in the slots 30.

Yet another aspect of the present invention is a method for charging more than one mobile device 100 in environments that can cause damage to mobile devices 100. The method includes charging a battery of an apparatus 20 that is capable of charging more than one mobile device 100, placing one or more mobile devices 100 in a slot 30 of the apparatus housing 22, which is elevated above a surface of a venue, attaching to a mobile device 100 a connector unit, which is connected to a cable that is connected to the apparatus 20, and charging the mobile device 100 with power from the apparatus' battery.

The apparatus 20 is easily hand carried. The apparatus 20 is easily cleaned and suitable for use on a bar or table in a restaurant. The charging cables are captive and not easily misplaced or stolen, yet are simple to maintain. The BLUETOOTH LOW ENERGY "(BTLE"), NFC and/or BLUETOOTH is preferably used as a security system to prevent theft of the apparatus 20. The apparatus (with BTLE, NFC and/or Bluetooth) can be used to monitor customer presence, arrival, departure and dwell time. The apparatus' monitored data can be easily retrieved by either a utility application on a smart phone carried near he apparatus during use. The apparatus' monitored data can be easily retrieved by a utility application while the apparatus' are stacked during charging.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. An apparatus for charging multiple mobile devices in a hazardous environment, the apparatus comprising:
    a housing;
    a support mechanism;
    a plurality of device placement slots;
    a processor; and
    a plurality of connections, each of the plurality of connections corresponding to a placement slot;
    wherein the apparatus is configured to provide power to multiple mobile devices placed in the plurality of slots;
    wherein the apparatus is configured to charge mobile devices at differing rates based on power output demand, the number of mobile devices attached to the apparatus, and the internal charge state of the apparatus.

2. The apparatus according to claim 1 wherein the mobile devices are selected from a mobile phone, a tablet computer, a MP3 player, a camera, a flashlight, a game console, and a BLUETOOTH headset.

3. The apparatus according to claim 1 wherein the apparatus is configured to have three modes, the three modes comprising a standalone charging mode, a stacked charging mode and a dissipation mode.

4. The apparatus according to claim 1 wherein the apparatus is configured for stacking with a second apparatus.

5. The apparatus according to claim 1 wherein each of the plurality of device placement slots is an opening in a top section of the housing having a width ranging from 1 cm to 4 cm, wherein the housing a diameter ranging from 10 cm to 25 cm, and wherein the housing has a height ranging from 1 cm 7 cm.

6. The apparatus according to claim 1 further comprising a buck regulator for delivering power to a plurality of USB IC charger circuits for delivering power to an attached mobile device.

7. The apparatus according to claim 1 further comprising a plurality of pogo pins on a bottom section of the housing and a plurality of pads on a top section of the housing, the plurality of pogo pins and the plurality of pads for stacking.

8. A stable, durable, portable system for charging of multiple portable electronic devices, the system comprising:
    an apparatus comprising:
        a housing;
        a plurality of device placement slots;
        a battery;
        a processor; and
        a plurality of connections for attachment to a portable device;
        wherein the system is capable of charging portable devices at differing rates based on a power output demand, the number of portable devices attached, and the internal charge state of the system.

9. The system according to claim 8 wherein the system is capable of supporting one or multiple portable devices in a convenient and usable position during charging, enabling the use of portable devices for social interaction while charging.

10. The system according to claim 8 wherein the system is capable of controlling its own re-charging rate while 'stacked' based on available power to the stack and each apparatus in the stack, the internal charge of the battery, and the position of the apparatus in a stack of recharging apparatuses.

11. The system according to claim 8 wherein the system has a three-pin stacking communication which safely allows exposure of the charging pins to end users while facilitating stacking and rapid programming, as well as variable charging rates based on position within the stack, own charge status and available power.

12. The system according to claim 8 wherein the system which includes both NFC (Near Field Communications), BLUETOOTH and BLUETOOTH Smart personal area network (PAN) devices.

13. The system according to claim 12 wherein NFC (Near Field Communications), BLUETOOTH and BLUETOOTH Smart personal area network (PAN) devices allows communication with modern Smart Phones for the purposes of determining/enablingphysical proximity for social grouping for Smartphone applications such as Truth or Dare or for exchange of information, photos, videos or other media.

14. The system according to claim 12 wherein NFC (Near Field Communications), BLUETOOTH and BLUETOOTH Smart personal area network (PAN) devices allows communication with modern Smart Phones for the purposes of determining/enabling physical proximity for reviews, coupons or discounts.

15. The system according to claim 12 wherein NFC (Near Field Communications), BLUETOOTH and BLUETOOTH Smart personal area network (PAN) devices allows communication with modern Smart Phones for the purposes of determining/enabling physical proximity for menus, specials of the day, waitress alerts, food status or seating status.

16. The system according to claim 8 wherein the portable devices are selected from the group including phones, tablets, game consoles, music players, flashlights, BLUETOOTH headsets and cameras.

17. The system according to claim 8 wherein the system is suitable for use in public social settings, easily removed or replaced for restoring the internal charge without requiring cable attachment, expertise or training.

18. An apparatus for charging multiple mobile devices in a hazardous environment, the apparatus comprising:
  a housing;
  a support mechanism;
  a plurality of device placement slots;
  a processor;
  a plurality of connections, each of the plurality of connections corresponding to a placement slot;
  a video display for displaying advertising during the charging of a mobile device;
  wherein the apparatus is configured to provide power to multiple mobile devices placed in the plurality of slots;
  wherein the apparatus is capable of charging portable devices at differing rates based on a power output demand, the number of portable devices attached and the internal charge state of the system.

* * * * *